US005617929A

United States Patent [19]
Richardson et al.

[11] Patent Number: 5,617,929
[45] Date of Patent: Apr. 8, 1997

[54] MOVABLE SHIFT CONSOLE

[75] Inventors: Donald A. Richardson, Renton; Walter E. Benz, Bonney Lake, both of Wash.

[73] Assignee: PACCAR Inc, Bellevue, Wash.

[21] Appl. No.: 540,452

[22] Filed: Oct. 10, 1995

[51] Int. Cl.$^6$ .................................................. B60K 20/00
[52] U.S. Cl. ........................ 180/326; 180/334; 180/336; 74/473 R; 297/217.1
[58] Field of Search .................................... 180/318, 321, 180/323, 326, 329, 333, 334, 336, 315, 324, 330, 331; 74/473 R; 297/411.31, 217.1

[56] References Cited

U.S. PATENT DOCUMENTS

| | | | |
|---|---|---|---|
| 4,055,230 | 10/1977 | Kestian et al. | 180/333 |
| 4,057,122 | 11/1977 | Brownell et al. | 180/329 |
| 4,200,166 | 4/1980 | Hansen | 180/333 |
| 4,478,308 | 10/1984 | Klaassen | 180/326 |
| 4,552,032 | 11/1985 | Kanai | 74/473 R |
| 4,580,647 | 4/1986 | Peifer et al. | 180/334 |
| 4,646,869 | 3/1987 | Kerner, Jr. | 180/334 |
| 4,732,232 | 3/1988 | Miyagi et al. | 180/336 |
| 5,144,853 | 9/1992 | Giudici | 74/473 R |
| 5,409,079 | 4/1995 | Strong et al. | 180/326 |

FOREIGN PATENT DOCUMENTS

| | | | |
|---|---|---|---|
| 2754543 | 6/1978 | Germany | 180/326 |
| 61-157442 | 7/1986 | Japan | 180/336 |

Primary Examiner—Brian L. Johnson
Assistant Examiner—Peter C. English
Attorney, Agent, or Firm—Seed and Berry LLP

[57] ABSTRACT

A movable gear shift console assembly positioned in the driving compartment of a vehicle and movably coupled to a seat portion of a driver seat in the vehicle driving compartment. The movable gear shift console assembly includes a pair of pivot arms that are pivotally connected at outer ends to the seat portion, such that the outer ends of the pivot arms pivot about vertical pivot axes. The inner ends of the pivot arms are connected to a shift console. The shift console includes a gear shifter operatively connected to a vehicle's transmission, and a housing structure partially surrounding and protecting the gear shifter. The shift console is movable relative to the driver seat between a forward, operating position for use while driving the vehicle, and a rear, stored position for storing the shift console rearwardly adjacent to the driver seat. In the rear, stored position, the shift console is substantially tucked in adjacent to the driver seat and permits substantially unobstructed movement of a person between the driver and passenger seats. An actuator is connected to at least one of the pivot arms and is coupled to the pneumatic system of the vehicle, and the air cylinder moves between an extended position and a retracted position so as to pull or push the pivot arms and move the shift console between the forward, operating and rear, stored positions.

26 Claims, 3 Drawing Sheets

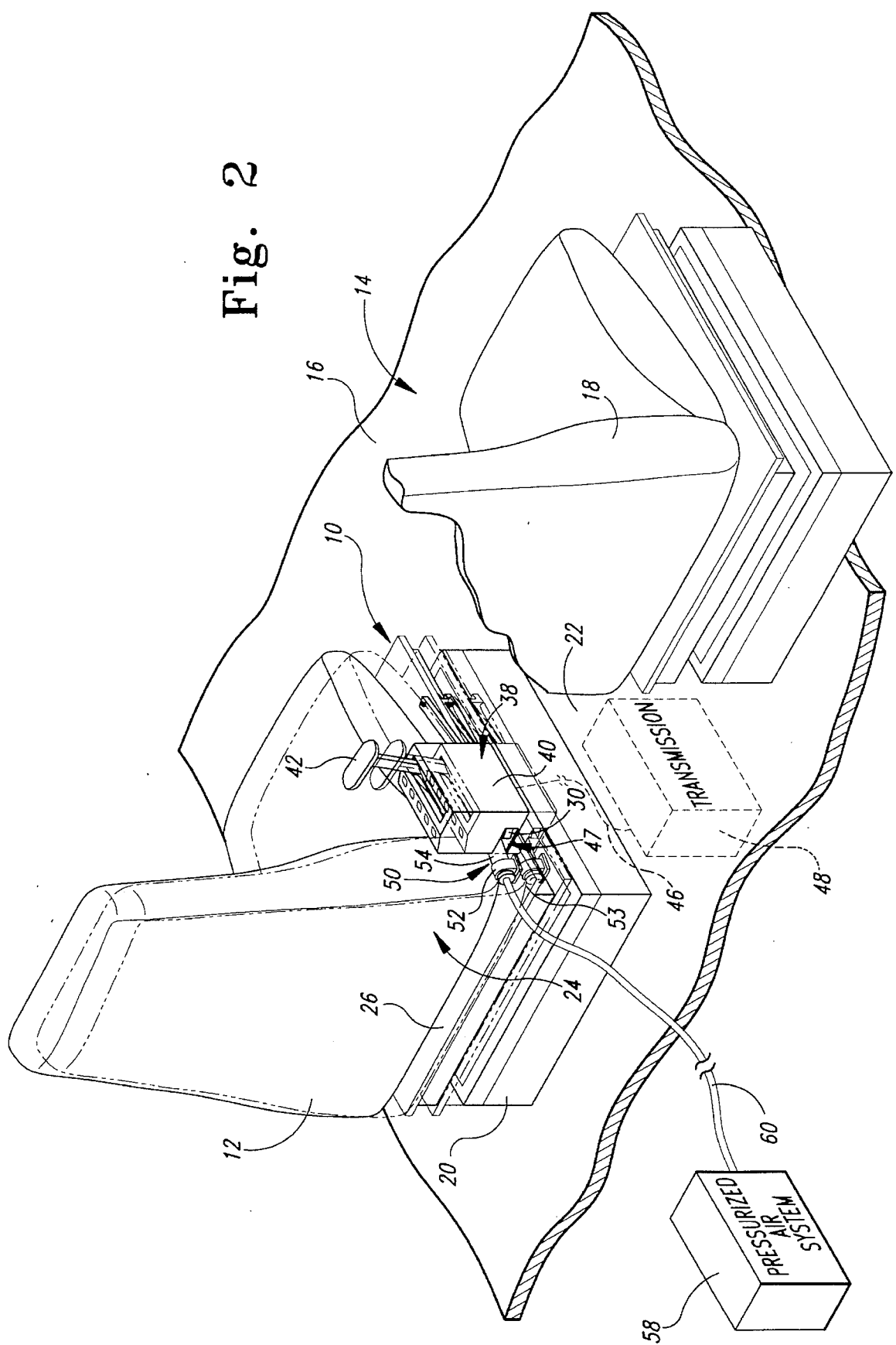

MOVABLE SHIFT CONSOLE

TECHNICAL FIELD

The present invention relates to a gear shift assembly and, more particularly, to a shift console assembly of an automotive vehicle, wherein the shift console assembly is connectable to a transmission of the vehicle.

BACKGROUND OF THE INVENTION

A conventional gear shift console of a long-haul truck, or other similar type of vehicle, is positioned in the truck's cab so it is accessible to a driver. The gear shift console is stationary and is rigidly mounted to the floor of the cab to the right of the driver seat between the driver seat and the forward passenger seat. However, the stationary shift console between the driver and passenger seats provides a substantial obstacle that the driver or passenger must climb over or around when moving about the cab. For example, a conventional long-haul truck has a sleeper compartment positioned behind the driver and passenger seats. To gain access to the sleeper compartment from the driver or passenger seats, a driver or passenger must move out of his or her respective seat, over or around the gear shift console, and through the space between the seats. Accordingly, the location of the stationary gear shift console is very cumbersome and awkward when trying to move about the vehicle's cab.

A further drawback to the stationary, floor-mounted gear shift console occurs upon adjusting the vertical or the fore/aft position of the driver seat. When the driver seat is moved vertically, fore, or aft, the gear shift console does not move with the seat, so the relative distance between the seat and the gear shift console changes. The optimum position of the driver seat relative to the truck's steering wheel, control pedals, and control panels often will not correspond to the optimum position of the gear shift console relative to the seat for each driver. Thus, while the driver seat is adjustable in several directions to accommodate different sizes or drivers or different driving styles, the conventional, stationary gear shift console is not adjustable to accommodate different drivers.

SUMMARY OF THE INVENTION

The present invention provides a movable gear shift console assembly for use in a motor vehicle that has a transmission and a driving compartment. The position of the gear shift console assembly relative to the driving compartment is adjustable. In a preferred embodiment of the invention, the motor vehicle has a driver seat in the driving compartment. The movable gear shift console assembly is connected to a console support structure in the driver compartment, such as the driver seat. The gear shift console assembly includes a shift console having a gear shifter therein that is operatively connected to the vehicle's transmission. The shift console is pivotally attached to a pivot arm, and the pivot arm extends away from the shift console and is pivotally connected to the driver seat. The pivot arm is pivotal relative to the driver seat about a vertical pivot axis, such that the shift console and the gear shifter are movable as a unit relative to the driver seat through a substantially horizontal plane between a forward, operating position and a rear, stored position. In the rear, stored position, the shift console is located substantially out of the space between the driver seat and the passenger seat to allow for substantially uninhibited movement therethrough.

In the preferred embodiment of the invention, the driver seat is a structure having a frame securely fastened to the floor of the vehicle's driving compartment, and a seat portion is movably connected to the frame such that the seat portion is adjustably movable in vertical and horizontal directions relative to the frame and relative to the floor. The gear shift console assembly is connected to the seat portion, and when the seat portion moves vertically or horizontally, the gear shift console assembly moves with the seat portion relative to the floor and frame. The preferred embodiment of the present invention includes a pair of pivot arms pivotally connected to the seat portion with a pair of vertically oriented pivot pins that each pivot about a respective vertical pivot axis. The opposite ends of the pivot arms are pivotally connected to the shift console by a pair of vertical pivot pins that pivot about vertical pivot axes at the shift console.

The gear shift console assembly of the present invention also includes an actuator connected to at least one of the pivot arms. The actuator is adapted to push and pull on at least one of the pivot arms, upon activation of the actuator, such that a force is exerted on the pivot arm to pivot both pivot arms about the vertical pivot axes, thereby moving the shift console in the horizontal plane between the forward, operating position and the rear, stored position. A control mechanism is mounted to the housing of the shift console and is coupled to the actuator to control the position of the shift console relative to the seat portion.

BRIEF DESCRIPTION OF THE DRAWINGS

FIG. 2 is an isometric view of the movable gear shift console assembly of FIG. 1 shown in a rear, stored position.

DETAILED DESCRIPTION OF THE INVENTION

Figure 1:
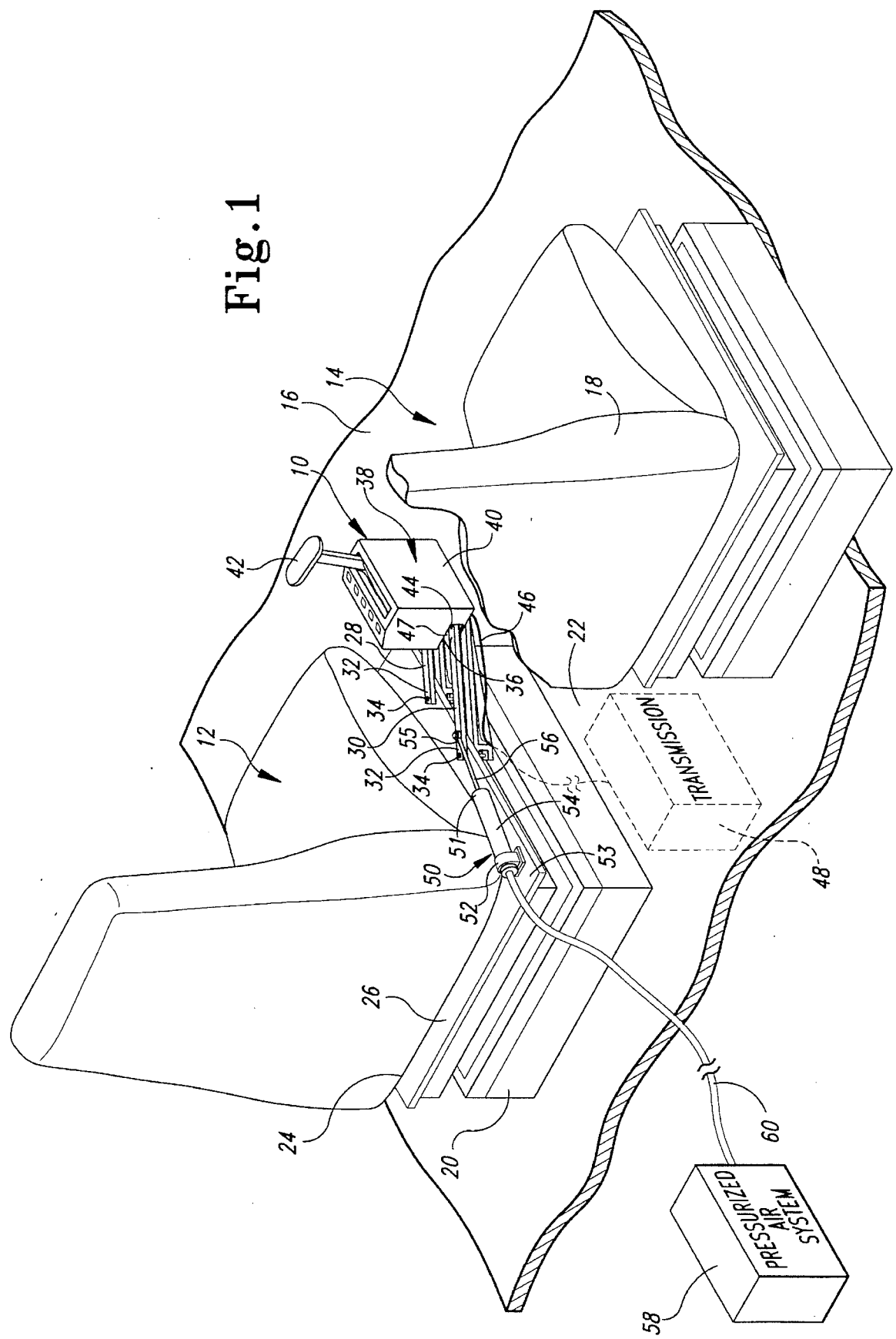
FIG. 1 is an isometric view showing a movable gear shift console assembly in accordance with the present invention, attached to a driver seat in a vehicle driving compartment, and the gear shift console assembly is shown in a forward, operating position.

A gear shift console assembly 10 in accordance with the present invention is illustrated in FIGS. 1 and 2 attached to a driver seat 12 positioned in a driving compartment 14 of a conventional motor vehicle 16. The assembly 10 is pivotally mounted to the side of the driver seat 12 between the driver seat and an adjacent passenger seat 18. The space between the driver seat and passenger seat 12 and 18 is sized to allow a driver or passenger to move through the space, for example, from the seating area toward a sleeping compartment in a long-haul vehicle or the like. The assembly 10 is pivotally movable relative to the driver seat 12 between a forward, operating position, illustrated in FIG. 1, and a rear, stored position, illustrated in FIG. 2. In the forward, driving position, the assembly 10 extends forwardly and partially into the space between the driver seat 12 and the passenger seat 18, such that the assembly is easily accessible by a driver for operation of the vehicle 16. In the rear, stored position, the assembly 10 is positioned immediately adjacent to a rear portion of the driver seat 12 and substantially removed from the space between the driver and passenger seats. Accordingly, when the assembly 10 is in the rear, stored position, the driver or a passenger can easily move through the space between the driver and passenger seats 12 and 18 with a minimal amount of interference.

Although the assembly 10 of the invention is described and illustrated as being pivotally mounted to the driver seat 12, the assembly is pivotally mountable to other console support structures, such as the passenger seat 18, the dash panel or the like, for movement of the assembly relative to the console support structure. The assembly 10 is movable to a stored position, such as adjacent to the dash panel or the passenger seat or the like to minimize interference as a person moves about the driving compartment.

The driver seat 12 has a frame 20 that is securely attached to the floor 22 of the vehicle's driving compartment 14. A seat portion 24 of the driver seat 12 is movably connected to the frame 20. The movable seat portion 24 allows the driver to position the seat in a desired and comfortable location relative to the frame and relative to vehicle operating controls, not shown, within the driving compartment in order to facilitate safe operation of the vehicle 16. In the preferred embodiment, the position of the seat portion 24 is adjustable horizontally or vertically to allow a driver to customize the driver seat location for maximum comfort during operation of the vehicle 16.

The seat portion 24 includes a base 26 that is connected to a conventional seat adjustment mechanism attached to the frame 20. The gear shift console assembly 10 is pivotally mounted to the seat portion's base 26. As the seat portion 24 moves horizontally or vertically relative to the frame 20, the gear shift console assembly 10 moves as a unit with the seat portion relative to the frame. Accordingly, the position of the assembly 10 relative to the seat portion 24 remains constant, for example, when the assembly is in the forward, operating position, regardless of whether the seat portion 24 is moved upwardly, downwardly, forwardly, or rearwardly relative to the frame.

Figure 3:
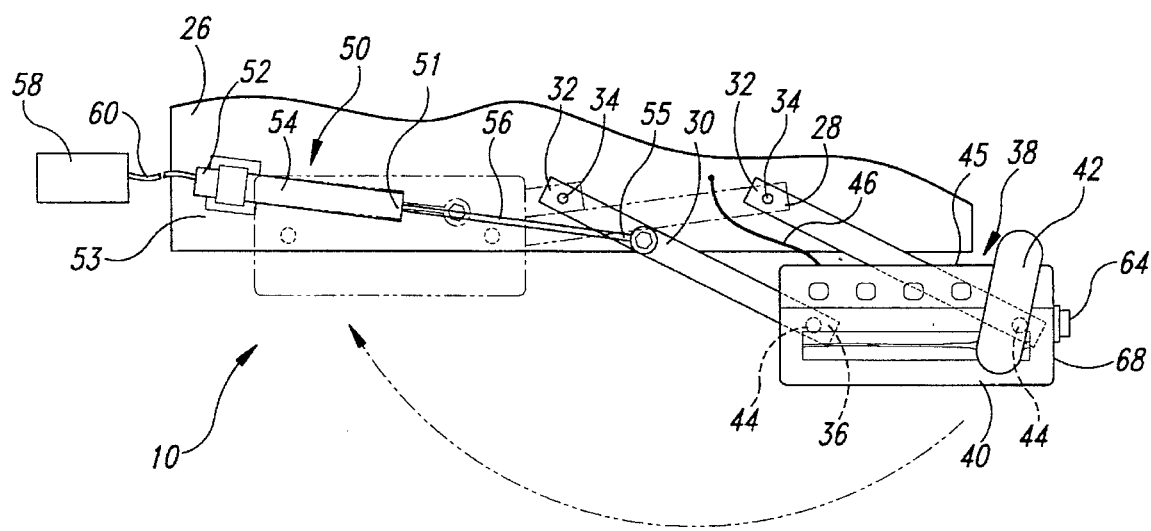
FIG. 3 is an enlarged top plan view of the movable gear shift console assembly of FIG. 1.

As is best seen in FIGS. 1 and 3, the gear shift console assembly 10 has forward and rear pivot arms 28 and 30 attached at their inner ends 32 to the base 26 of the seat portion 24. Each of the forward and rear pivot arms 28 and 30 has a vertically aligned pivot pin 34 that extends through the base 26, and the respective pivot arm pivots about the vertical axis of its pivot pin. The forward and rear pivot arms 28 and 30 extend away from the base 26 in a substantially horizontal and parallel orientation and pivotally attach at their outer ends 36 to a shift console 38. The assembly's shift console 38 includes a housing 40 and a gear shift lever 42 movably supported within the housing. The gear shift lever 42 is operably connected in a conventional manner to the motor vehicle's transmission 48, shown schematically in FIG. 1. The gear shift lever 42 is movable between a plurality of selectable positions to selectively control the transmission.

In the preferred embodiment, the motor vehicle 16 is a long-haul truck and the transmission 48 is an automatic shifting, 10-speed transmission, such as an Eaton Autoselect transmission. The gear shift lever 42 is electrically connected to the transmission 48 by a conventional connector 46 in a manner as is known in the art for a "shift-by-wire" transmission system. Accordingly, the electrical connection between the shift console 38 and the transmission 48 provides a minimal amount of resistance to movement of the shift console relative to the seat portion 24.

Each of the outer ends 36 of the forward and rear pivot arms 28 and 30 includes a vertically aligned pivot pin 44 that extends through a lower, side portion of the housing structure 40 such that the forward and rear pivot arms are pivotally attached to the shift console 38. In the illustrated embodiment, the inner sidewall 45 of the housing 40 has a substantially horizontal channel portion 47 therein that receives the outer ends 36 of the forward and rear pivot arms 28 and 30. The pivot pins 44 extend across the channel portion 47 and into the lower portion of the housing 40 to securely and pivotally connect the shift console 38 to the side of the seat portion 24.

The interconnection of the pivot arms 28 and 30 with the seat portion 24 and the shift console 38 allows the shift console to sweep through an arc in the substantially horizontal plane, as is illustrated in FIG. 3, to move the shift console above the floor between the forward, driving position, illustrated in solid lines, and the rear, stored position, illustrated in phantom lines. The pivotal connection between the outer ends 36 of the front and rear pivot arms 28 and 30 and the shift console 38 allows the shift console to maintain a constant alignment with the seat portion 24 without rotating relative to the seat portion as the shift console moves between the forward, operating position and the rear, stored position. In the rear, stored position, outer portions of the forward and rear pivot arms 28 and 30 are received in the channel 47 in the lower portion of the housing 40 such that the shift console 38 tucks in immediately adjacent to the seat portion 24, thereby allowing the driver or passenger to move between the driver and passenger seats 12 and 18 with a minimal amount of interference from the shift console.

The shift console 38 is movably positioned above the driving compartment's floor 22 with a vertical space therebetween. In the preferred embodiment, the forward and rear pivot arms 28 and 30 are constructed of a lightweight, substantially rigid material, such as aluminum or the like, to minimize vertical deflection of the pivot arms when the shift console 38 is in the forward, operating position, and when the shift console is moved between the forward, operating position and the rear, stored position.

The elevated position of the shift console 38 provides for maximum usable floor space between the driver and passenger seats 12 and 18, for ingress or egress from the seats. Accordingly, the driver or passenger can easily move about the driving compartment without kicking or tripping over the shift console 38.

As best seen in FIG. 3, the outer and inner ends 36 and 32 of the forward and rear pivot arms 28 and 30 are securely connected to the seat portion 24 and to the shift housing 38, respectively, such that the forward and rear pivot arms move simultaneously and remain parallel to each other. As a result, movement of the rear pivot arm 30 causes the forward pivot arm 28 to simultaneously move through the same range of motion. As best seen in FIGS. 1, 2, and 3, the shift console 38 and the forward and rear pivot arms 28 and 30 are moved between the forward, operating position and the rear, stored position by an actuator 50 mounted to the base 26 of the seat portion 24 rearward of the rear pivot arm. The actuator 50 of the preferred embodiment is a pneumatic actuator having a pneumatic cylinder 54 pivotally secured to the base 26 of the seat portion 24. The actuator also includes an actuator rod 56 that extends outwardly from the forward portion 51 of the pneumatic cylinder 54.

The pneumatic cylinder 54 is pivotally mounted at its rearward end 52 to a rear portion 53 of the base 26, and the forward end 55 of the actuator rod 56 is pivotally connected to the rear pivot arm 30. The pneumatic cylinder 54 is a double-action cylinder that is connected to the vehicle's pneumatic system 58, shown schematically in FIG. 1, by a hose 60, such that activation of the pneumatic cylinder generates a force which actively moves the actuator rod 56 axially in the forward or rearward direction. As best seen in FIG. 3, the actuator rod 56 is movable between a fully extended position, shown in solid lines, and a retracted position, shown in phantom lines. The actuator rod 56 is attached to the rear pivot arm 30 at a position away from the rear pivot pin 34, thereby creating a lever arrangement for efficient movement of the shift console 38.

When the pneumatic cylinder 54 moves the actuator rod 56 from the retracted position to the extended position, the actuator rod 56 pushes forwardly and exerts a force on the rear pivot arm 30 that causes the rear pivot arm and the forward pivot arm 28 to pivot simultaneously about the vertically aligned pivot pins 34, thereby moving the shift console 38 from the rear, stored position to the forward, operating position. As the gear shift console 38 moves toward the forward, operating position, the outer ends 36 of the forward and rear pivot arms 28 and 30 pivot about the outer pivot pins 44 to maintain alignment of the shift console 38 relative to the seat portion 24. When the pneumatic cylinder 54 is activated and the actuator rod 56 is moved from the extended position to the retracted position, the actuator rod pulls rearwardly on the rear pivot arm 30 and causes the shift console 38 to sweep through a horizontal arc to the rear, stored position. In the rear, stored position, the actuator rod 56 and a portion of the pneumatic cylinder 54 are positioned in the channel portion 47 in the housing 40, so the shift console 38 is as close to the seat portion 24 as possible.

As the actuator rod 56 extends or retracts and pivots the forward and rear pivot arms 28 and 30 about the inner pivot pins 34, the actuator rod also causes the pneumatic cylinder 54 to pivot about a pivot axis at the connection between the cylinder's rearward portion 52 and the seat portion's base 26, as is illustrated in FIG. 3. Such pivotal motion of the pneumatic cylinder 54 enables the actuator rod 56 to move between the fully extended position and the fully retracted position without binding or causing excessive stresses on the rear pivot arm 30 during operation of the gear shift console assembly 10.

Although the preferred embodiment utilizes a pneumatic cylinder 54 that is connected to the pressurized air system 58 of the vehicle 16, another type of actuator, such as a hydraulic actuator, an electrical actuator, or the like, may be utilized to move the forward and rear pivot arms 28 and 30 and the gear shift console 38 between the forward, operating position and the rear, stored position.

Figure 4:
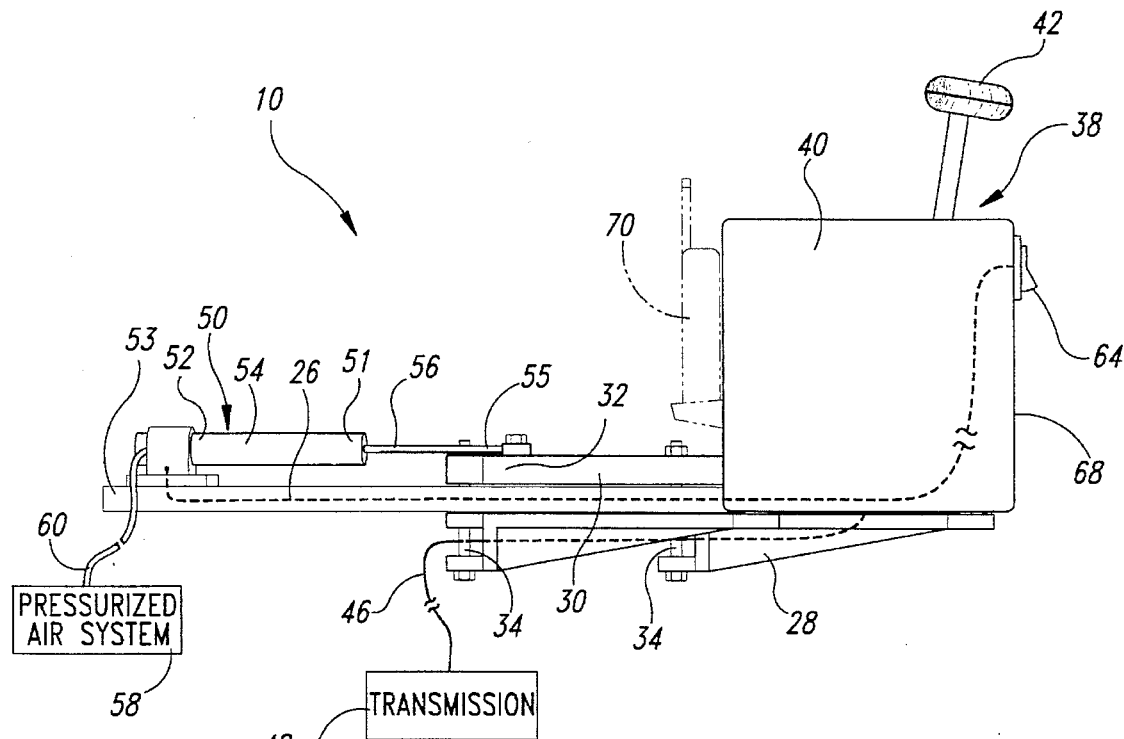
FIG. 4 is an enlarged side elevation view of the movable gear shift console assembly of FIG. 1.

As best seen in FIG. 4, a control switch 64 having selectable positions is mounted on the shift console's housing 40. The control switch 64 is operatively coupled to the actuator 50 to control the flow of pressurized air in the pneumatic cylinder 54, and thereby controlling activation of the actuator and the resulting movement of the forward and rear pivot arms 28 and 30 and the shift console 38. The control switch 64 is positioned on the forward face 68 of the housing 40 in an ergonomically beneficial position that allows the driver to easily manipulate the control switch while sitting in the driver seat 12 when the shift console 38 is in either the forward, operating position or the rear, stored position. In the preferred embodiment, the pneumatic cylinder 54 and actuator rod 56 act as a locking mechanism that locks the shift console 38 in the selected forward or rear position to avoid premature movement of the shift console from the selected position.

In the embodiment illustrated in FIG. 4, a cellular phone 70 is mounted to a rear face of the shift console's housing 40. The cellular phone provides a building block of the HighwayMaster communications systems. The cellular phone 70 remains fully functional when the shift console 38 is moved between the forward, operating position and the rear, stored position.

Repositioning of the gear shift console assembly 10 when, for example, the shift console 38 is in the forward, operating position, is accomplished by moving the control switch 64 to a selected position that corresponds to rearward movement of the shift console. The pneumatic actuator 50 is activated and the pneumatic cylinder draws the actuator rod 56 from the extended position to the retracted position, thereby exerting a pulling force on the rear pivot arm 30. The exerted force simultaneously pivots the forward and rear pivot arms 28 and 30 about multiple vertical axes defined by the pivot pins 34 and 44. The forward and rear pivot arms 28 and 30 and the shift console are moved relative to the seat portion 24 through the horizontal arc to the rear, stored position. Once in the rear, stored position, the pneumatic actuator 50 securely retains the shift console 38 in place substantially out of the pathway between the driver and passenger seats 12 and 18, thereby providing uninhibited access from or into the seat area.

When the gear shift console assembly 10 is moved from the rear, stored position to the forward, operating position, the driver or passenger moves the control switch 64 to a second selectable position that corresponds to forward movement of the shift console 38. The pneumatic actuator 50 is activated and the pneumatic cylinder 54 moves the actuator rod 56 from the retracted position to the extended position. The actuator rod 56 exerts a pushing force on the rear pivot arm 30 and causes the forward and rear pivot arms 28 and 30 to simultaneously pivot about the pivot pins 34 and 44, and the outer ends of the pivot arms move forwardly through the horizontal arc. As a result, the shift console 38 is moved in the horizontal plane to the forward, operating position. Once in the forward, operating position, the shift console 38 is locked in the forward position and prevented from inadvertently or prematurely moving, as an example, while the driver is operating the vehicle.

Numerous modifications and variations of the movable shift console disclosed herein will occur to those skilled in the art in view of this disclosure. As an example, the gear shift console can be moved to and securely retained in a plurality of positions between the forward, operating position and the rear, stored position to provide for adjustable horizontal positioning of the gear shift lever relative to the driver seat as is desired for different drivers. Therefore, it is to be understood that these modifications and variations may be practiced while remaining within the spirit and the scope of the invention as defined in the following claims.

We claim:

1. A movable shift console for use in a motor vehicle having a transmission, a driving compartment, and a seat in the driving compartment, comprising:

an arm pivotally connected to the seat, said arm being pivotable relative to the seat about a vertical pivot axis; and a shift console pivotally connected to said arm, said shift console being movably connected to the seat by the arm, said shift console having a gear shifter operatively connected to the transmission, said shift console being movable as a unit relative to the seat in a substantially horizontal plane between a first position and a second position.

2. The movable shift console of claim 1 wherein said arm is a first arm and said vertical pivot axis is a first vertical pivot axis, and further comprising a second arm connected to the seat adjacent to said first arm and connected to said shift console, said second arm being pivotable about a second vertical pivot axis adjacent to said first vertical pivot axis.

3. The movable shift console of claim 2 wherein said first and second arms are substantially parallel to each other.

4. The movable shift console of claim 2, further comprising an actuator connected to said first arm, said actuator being positioned to exert a force on said first arm that causes said first and second arms to pivot about said first and second vertical pivot axes, respectively, and that causes said shift console to move between said first and second positions.

5. The movable shift console of claim 4 wherein the vehicle has a pressurized air system, and said actuator is a pneumatic actuator connected to the pressurized air system.

6. The movable shift console of claim 4, further comprising an activation switch connected to said actuator, said activation switch having a selectable position that activates said actuator and causes said shift console to move between said first and second positions.

7. The movable shift console of claim 1, further comprising an actuator connected to said arm, said actuator being positioned to exert a force on said arm that causes said arm to pivot about said vertical pivot axis and that causes said shift console to move between said first and second positions.

8. The movable shift console of claim 7 wherein said actuator is a pneumatic actuator.

9. The movable shift console of claim 7 wherein said actuator is a hydraulic actuator.

10. A shift console assembly for use in a motor vehicle having a transmission and a driving compartment, comprising:

a seat structure having a frame and a seat portion, said seat portion being movable relative to said frame;

an arm connected to said seat portion, said arm being movable relative to said seat portion and being pivotable about a vertical pivot axis; and a shift console pivotally connected to said arm with said arm movably coupling said shift console to said seat portion, said shift console having a housing and a gear shifter, said gear shifter being operatively connected to the transmission, said housing and gear shifter being movable as a unit in a substantially horizontal plane perpendicular to said vertical pivot axis, and said shift console being movable in said horizontal plane relative to the seat portion of said seat structure between a first position and a second position.

11. The shift console assembly of claim 10 wherein said seat portion is movable in a vertical direction relative to said frame, and said shift console and said arm are movable with said seat portion as a unit in said vertical direction relative to said frame.

12. The shift console assembly of claim 10 wherein said arm is a first arm and said vertical pivot axis is a first vertical pivot axis, and further comprising a second arm connected to said seat portion adjacent to said first arm, said second arm being connected to said shift console and being pivotable about a second vertical pivot axis adjacent to said first vertical pivot axis.

13. The shift console assembly of claim 12 wherein said first and second arms are substantially parallel.

14. The shift console assembly of claim 12, further comprising an arm moving device connected to said first arm, said arm moving device being positioned to exert a force on said first arm that causes said first and second arms to pivot about said first and second vertical pivot axes, respectively, and that causes said shift console to move between said first and second positions.

15. The shift console assembly of claim 14 wherein the vehicle has a pressurized air system, and said arm moving device is a pneumatic actuator connected to the pressurized air system.

16. The shift console assembly of claim 10, further comprising an arm moving device connected to said arm, said arm moving device being positioned to exert a force on said arm that causes said arm to pivot about said vertical pivot axis and that causes said shift console to move between said first and second positions.

17. A method of moving a gear shift console in a driving compartment of a vehicle, the gear shift console being pivotally connected to a seat by at least one arm, comprising:

exerting a substantially horizontal force on the at least one arm;

pivoting said at least one arm about a substantially vertical pivot axis located immediately adjacent to the seat, said gear shift console being attached to said at least one arm opposite said pivot axis; and moving the gear shift console relative to said seat in a substantially horizontal plane between a forward position and rearward position.

18. The method of moving a gear shift console of claim 17 wherein the at least one arm is connected to an actuator, and said step of exerting a substantially horizontal force on the at least one arm includes moving the actuator between an extended position and a retracted position.

19. The method of moving a gear shift console of claim 17, further comprising securely retaining said gear shift console in a selected one of said forward and rearward positions.

20. The method of moving a gear shift console of claim 17 wherein the seat has a frame structure and a seat portion movably attached to the frame structure, and the at least one arm of the gear shift console is connected to the seat portion, further comprising moving the seat portion of the seat in a vertical direction relative to the frame structure, whereby the gear shift console moves in a vertical direction relative to the frame structure but does not move in the vertical direction relative to the seat portion.

21. A movable shift console for use in a motor vehicle having a transmission and a driving compartment, comprising:

a console support structure in the driving compartment;

an arm pivotally connected to said console support structure, said arm being pivotable relative to the console support structure about a vertical pivot axis; and a shift console pivotally connected to said arm, said shift console being movably connected to said console support structure by the arm, said shift console having a gear shifter operatively connected to the transmission, said shift console being movable as a unit relative to said console support structure in a substantially horizontal plane between a first position and a second position.

22. The movable shift console of claim 21 wherein said console support structure is a seat assembly.

23. The movable shift console of claim 21 wherein said arm is a first arm and said vertical pivot axis is a first vertical pivot axis, and further comprising a second arm connected to said console support structure adjacent to said first arm and connected to said shift console, said second arm being pivotable about a second vertical pivot axis adjacent to said first vertical pivot axis.

24. The movable shift console of claim 23, further comprising an actuator connected to said first arm, said actuator being positioned to exert a force on said first arm that causes said first and second arms to pivot about said first and second vertical pivot axes, respectively, and that causes said shift console to move between said first and second positions.

25. The movable shift console of claim 21, further comprising an actuator connected to said arm, said actuator being positioned to exert a force on said arm that causes said arm to pivot about said vertical pivot axis and that causes said shift console to move between said first and second positions.

26. A shift console assembly for use in a motor vehicle having an electronically controlled automatic transmission and a driving compartment with a floor, the assembly comprising:

a driver seat structure having a frame securely fastened to the floor of the vehicle's driving compartment, a seat portion that is movably connected to said frame, said seat portion being adjustably movable in vertical and horizontal directions relative to said frame and relative to the floor;

a pair of spaced, vertically oriented first pivot pins connected to said seat portion, said first pivot pins being movable with said seat portion in said vertical and horizontal directions relative to said frame and relative to the floor;

a passenger seat connected to the floor adjacent to said driver seat, said passenger seat positioned to provide a space between said driver seat and said passenger seat;

first and second pivot arms each having a first end connected to a respective one of said first pivot pins on said seat portion, each of said first and second pivot arms having a second end having a second pivot-pin receiving portion, said first and second pivot arms being substantially parallel to each other and being pivotally connected to said seat portion by said first pivot pins with said first and second pivot arms being movable in a substantially horizontal plane relative to said seat portion;

a shift console coupled to the seat portion, said shift console having a housing, a gear shift lever movably connected to said housing, and a pair of spaced, vertically oriented second pivot pins connected to said housing, said second pivot pins securing said second ends of said first and second pivot arms to said housing, said shift console having a connector operatively connecting said gear shift lever to the transmission, said housing being movably positioned between the driver and passenger seats, said housing being movable relative to said driver seat and relative to said floor between a forward, operating position and a rearward, stored position, and said housing being positioned above the floor with a vertical space between the housing and the floor;

an air cylinder connected to said seat portion and to said first pivot arm, said air cylinder having a cylinder portion to control air pressure within said cylinder, said air cylinder having a movable actuating rod connected at one end to said first pivot arm between the first and second ends, said actuating rod being between an extended position with the shift console in the forward, operating position, and a retracted position with the shift console in the rearward, stored position, said air cylinder securely retaining said shift console in the forward, operating position or rearward, stored position;

a pressurized air source connected to the cylinder; and a control switch mounted on said housing of said shift console, said control switch being coupled to said air cylinder to control a flow of pressurized air into and out of said cylinder.

\* \* \* \* \*